May 4, 1948. O. J. HUELSTER 2,440,684
SOCKET FOR SNAP FASTENERS
Filed Sept. 28, 1944
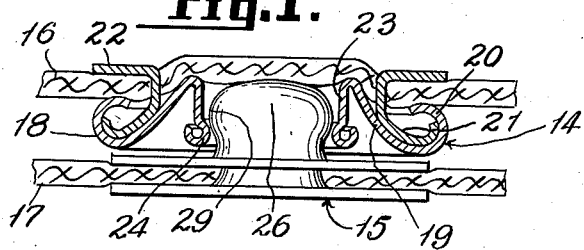
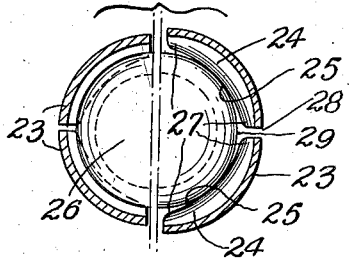
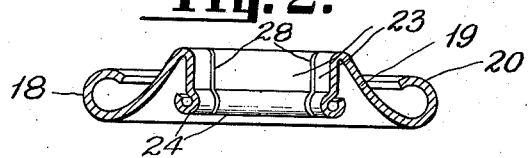
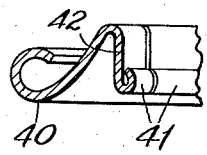
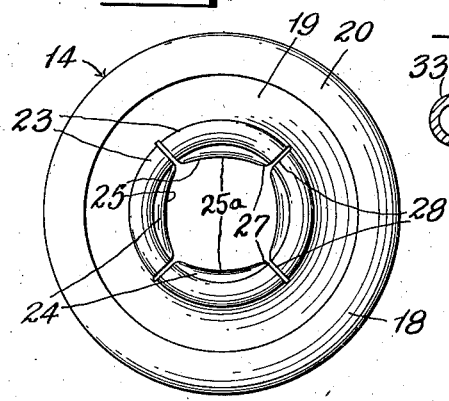
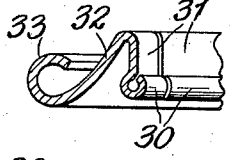
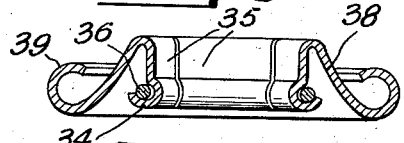
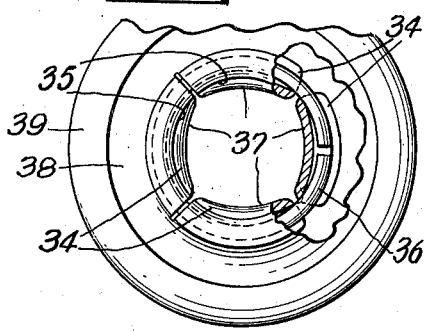
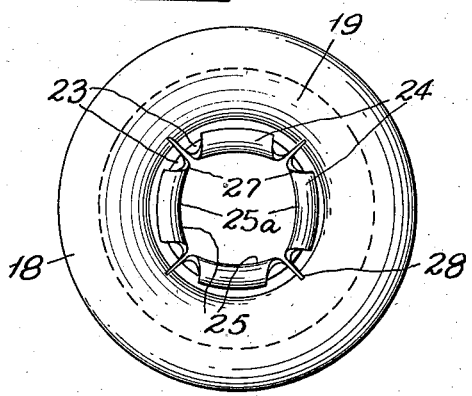
INVENTOR.
Otto J. Huelster
BY
Howard E. Thompson Patented May 4, 1948

2,440,684

UNITED STATES PATENT OFFICE 2,440,684

SOCKET FOR SNAP FASTENERS

Otto J. Huelster, Waterbury, Conn., assignor to Scovill Manufacturing Company, Waterbury, Conn., a corporation of Connecticut Application September 28, 1944, Serial No. 556,234

13 Claims. (Cl. 24—216)

This invention relates to the socket members of snap fasteners, wherein the socket member engages a stud member. More particularly, the invention deals with the construction of the gripper fingers of socket members of the kind under consideration, wherein the gripper fingers have beaded edges formed with a radius greater than that of the tubular wall portion defined by the fingers to produce of a combination of four fingers in a socket a more or less rectangular stud receiving opening, providing point contact of a cylindrical stud with the beads of each of said gripper fingers.

The novel features of the invention will be best understood from the following description, when taken together with the accompanying drawing, in which certain embodiments of the invention are disclosed, and in which the separate parts are designated by suitable reference characters in each of the views and in which:

Fig. 1 is a longitudinal sectional view through a socket made according to my invention shown mounted upon a support and also showing in side elevation a stud mounted in the socket.

Fig. 2 is a view similar to Fig. 1 showing a part of the socket detached.

Fig. 3 is a top plan view of the socket, as seen in Fig. 2.

Fig. 4 is a bottom plan view of the socket, as seen in Fig. 2.

Fig. 5 shows diagrammatic cross-sectional views illustrating in one half the position of gripper fingers engaging a stud, as in Fig. 1 and, in the other half, opposed gripper fingers in the operation of passing the beaded ends thereof over the stud head, inner surfaces only of the gripper fingers being shown.

Fig. 6 is a view similar to Fig. 2 showing the use of a spring ring in stiffening the action of the gripper fingers.

Fig. 7 is a partial plan view of the structure, as seen in Fig. 6, with part of the construction broken away and in section.

Fig. 8 is a view similar to Fig. 2 showing only part of the construction and showing a modification; and Fig. 9 is a view similar to Fig. 8 showing another form of construction.

The socket structure more fully hereinafter described, employs yieldable gripper fingers for engagement with the stud head which include beads or other projections on the fingers presenting curved surfaces engaging the stud head, thus minimizing frictional engagement with the head in coupling and uncoupling the stud with the socket. Further, as specifically shown, the bead or projection on the fingers is of considerably greater radius than the radius of the supporting wall of each finger or the tubular wall of the socket, thus producing a more or less square opening for the reception of the round head. This square opening presents on the fingers points or lines of contact with the head approximately centrally of the fingers, which minimizes the frictional engagement of the stud head and also minimizes the amount of expansion of the fingers in the passage of the head into and out of the socket member.

In Figs. 1–5 inclusive, is shown one form of construction which I employ, and in Fig. 1, is diagrammatically illustrated an assemblage of fastener parts. In this figure, 14 represents the socket part and 15 the stud part. These parts are respectively arranged on independent supports 16 and 17. The socket member 18 of the part 14 is shown detached in Figs. 2, 3 and 4 of the drawing. This member comprises an imperforated downwardly and outwardly flared wall portion 19, sometimes referred to as the breast wall of the member, and this wall terminates at its periphery in an inturned and curved flange 20 adapted to receive the outwardly flared prongs 21 of a mounting ring 22 employed to secure the member 18 to the support 16, as illustrated in Fig. 1. The inner end of the wall 19 terminates in a tubular wall portion defined, in the construction shown, by four circumferentially arranged gripper fingers 23. The gripper fingers 23 are arranged within the circumferential boundaries of the wall 19 and terminate at their lower ends in outwardly turned beaded projections 24. The wall portion of the fingers 23, which may be termed the supporting walls, are concentric with respect to the axis of the socket member; whereas the beaded projections 24 are formed eccentric with respect to the walls of the fingers and having a radius of curvature greater than the radius of curvature of said walls to provide inner surfaces 25 for engagement with the head 26 of the stud part 15. These inner surfaces normally produce a more or less square opening, as will clearly appear from a consideration of Fig. 3 of the drawing. In other words, the distances between the opposed center portion 25a of the curved surfaces 25 are only slightly greater than the distances between the opposed corners of the beads 24, for example, as indicated by the lead lines to the reference character 27, in Fig. 3 of the drawing. On the other hand, the diametrically opposite corners of the slots or slits 28 are spaced apart a greater distance than either of the other two opposed dimensions. It will thus be seen that, in the passage of the stud head 26 into the socket and over the surfaces 25, the enlarged portion 26 of the stud head will bear upon the central portions of the surfaces 25 in a more or less point or tangent contact, substantially as illustrated to the right of Fig. 5 of the drawing and the corners, as at 27, will be absolutely free of the head. By providing rounded or beaded projections 24 a smooth and easy action is provided in passing the rounded stud head into and out of the socket. It will also be apparent that the frictional engagement is materially minimized.

In Fig. 8 of the drawing is shown a slight modification of the construction shown in Figs. 1–5 inclusive, in which the beaded projection 30 at the ends of the gripper fingers 31 are turned inwardly rather than outwardly, as will appear in Figs. 1 and 2 of the drawing. Aside from this structural difference, the socket member of Fig. 8 will be the same as the socket member shown in Fig. 2, the imperforated wall 32 being the same as the wall 19 and the flange 33 as the flange 20. It will be apparent that with the structure shown in Fig. 8, as well as that shown in Fig. 2, the projections or beads 24—30 extend beyond the inside and outside diameters of the supporting walls of the gripper fingers. This adapts the socket member for the use described herein, and also adapts the socket member for use as a stud adapted to engage a socket having a rigid wall operating upon the outer surface of the gripper fingers. In the first instance, the fingers are flexed outwardly in coupling the fastener parts and, in the second instance, the fingers are flexed inwardly. As socket types of studs are well known, no specific use of the latter is here deemed to be necessary.

In Figs. 6 and 7 of the drawing, I have shown another slight modification of the construction shown in Figs. 1 and 4, and this modification simply comprises forming the enlargements or beads 34 on the inner ends of gripper fingers 35 open and of greater diameter to form within the beads recesses for the reception of a split spring ring 36. This ring is employed to reinforce the spring properties of gripper fingers which might have a slight spring tension. It is here to be borne in mind that with my novel construction, in providing the eccentric bearing surfaces of greater radius as heretofore described, the spring properties for the coupling and uncoupling engagement of the stud is materially minimized, not only from the standpoint of reducing frictional engagement, but also from the standpoint of having minimized the action contributed to the gripper fingers. In some instances, it will be desirable to amplify or strengthen this action by the inclusion of a spring ring. It will be apparent, however, that the reduction of frictional engagement is also maintained in that the beaded projections 34 have eccentric surfaces 37 of greater radius than the radius of the walls of the fingers 35, as with the construction shown in Figs. 1–5 inclusive.

Aside from the changes noted above, the socket member of Figs. 6 and 7 are similar to that of Figs. 1–4 inclusive, in employing an imperforated wall 38 similar to the wall 19 and an inturned peripheral flange 39 similar to the flange 20.

In Fig. 9 of the drawing I have shown at 40 a sectional view of one side portion of a socket member which differs from the member 18 primarily in the formation of the beads 41 at the inner free end portions of the fingers 42. In Fig. 1 of the drawing the beads 24 may be said to be substantially circular in form, whereas in Fig. 9, the beads 41 are semicircular and disposed only upon inner surfaces of the fingers 42. This construction will adapt the socket member 40 for use in connection with studs of the general type and kind shown at 15 in Fig. 1 of the drawing. Aside from this structural change, the socket member 40 is the same as the member 18 shown in Fig. 8. In other words, the beads 41 will be of the same general eccentric contour as the beaded projections 24, establishing thereby the more or less point contact with the stud part centrally of each of the fingers in the same manner as is illustrated at the right of Fig. 5 of the drawing.

My novel gripper finger construction may be said to provide on each gripper finger of a socket, means to establish a single point of contact with a cylindrical stud head movable into and out of the socket in the operation of coupling stud and socket parts of a fastener. In the present illustration, and by way of example, this is accomplished by an arrangement of four gripper fingers which results in the formation of a substantially square opening between the gripper ends of said fingers for the reception of the stud head. However, a lesser or greater number of fingers may be employed. When other numbers of fingers are employed, the contour of the opening will be modified in proportion to the arrangement of fingers.

My invention as illustrated in the accompanying drawing is applied to socket parts of relatively thin construction as mounted upon the support therefor, thus facilitating laundering of the supports. It will also be apparent that in all instances, the gripper fingers including the beaded or enlarged ends thereof are completely disposed within the circumferential boundaries of the imperforated wall portion, sometimes referred to as the breast wall of the socket member. Thus in laundering, this wall protects the fingers against any crushing strains, and maintains proper function and operation of the socket member in engaging and disengaging the stud part at all times.

Having fully described my invention, what I claim as new and desire to secure by Letters Patent is:

1. A socket part for snap fasteners, said part having a circumferentially continuous rigid wall terminating at its periphery in an inturned curved annular flange, a plurality of circumferentially arranged gripper fingers extending integrally from the inner end of said wall and forming a stud receiving bore arranged within circumferential boundaries of said wall, said fingers having at their lower ends beaded projections extending into said bore beyond the limits of said fingers, said fingers being curved concentrically with respect to the axis of said bore, and said beaded ends having curved surfaces eccentric to the curvature of said fingers and formed on a radius greater than the radius of the curvature of said fingers.

2. A socket part for snap fasteners, said part having a circumferentially continuous rigid wall terminating at its periphery in an inturned curved annular flange, a plurality of circumferentially arranged gripper fingers extending integrally from the inner end of said wall and forming a stud receiving bore arranged within circumferential boundaries of said wall, said fingers having at their lower ends beaded projections extending into said bore beyond the limits of said fingers, said fingers being curved concentrically with respect to the axis of said bore, said beaded ends having curved surfaces eccentric to the curvature of said fingers and formed on a radius greater than the radius of the curvature of said fingers, and said beaded ends of the fingers projecting beyond outer surfaces of the fingers.

3. A socket part for snap fasteners, said part having a circumferentially continuous rigid wall terminating at its periphery in an inturned curved annular flange, a plurality of circumferentially arranged gripper fingers extending integrally from the inner end of said wall and forming a stud receiving bore arranged within circumferential boundaries of said wall, said fingers having at their lower ends beaded projections extending into said bore beyond the limits of said fingers, said fingers being curved concentrically with respect to the axis of said bore, said beaded ends having curved surfaces eccentric to the curvature of said fingers and formed on a radius greater than the radius of the curvature of said fingers, the beaded ends of the fingers forming collectively an annular recess on said fingers, and a spring ring mounted in said recess.

4. A socket part for snap fasteners, said part having a circumferentially continuous rigid wall terminating at its periphery in an inturned curved annular flange, a plurality of circumferentially arranged gripper fingers extending integrally from the inner end of said wall and forming a stud receiving bore arranged within circumferential boundaries of said wall, said fingers having at their lower ends beaded projections extending into said bore beyond the limits of said fingers, said fingers being curved concentrically with respect to the axis of said bore, said beaded ends having curved surfaces eccentric to the curvature of said fingers and formed on a radius greater than the radius of the curvature of said fingers, and the eccentric surfaces of the beaded ends of said fingers collectively forming a restricted opening in said socket member of substantially rectangular form.

5. In snap fasteners employing socket and stud parts, a socket part having a tubular stud receiving portion defined by circumferentially arranged gripper fingers of essentially cylindrical curvature, the free ends of said gripper fingers having inwardly projecting gripper ends, and said gripper ends having curved surfaces of a greater radius than the radius of curvature of said fingers, forming at the end of said stud receiving portion a restricted passage of substantially rectangular form.

6. In snap fasteners employing socket and stud parts, a socket part having a tubular stud receiving portion defined by circumferentially arranged gripper fingers of essentially cylindrical curvature, the free ends of said gripper fingers having inwardly projecting gripper ends, and said gripper ends having curved surfaces of a greater radius than the radius of curvature of said fingers, forming at the end of said stud receiving portion a restricted passage having stud engaging contact points substantially centrally of each of said gripper ends.

7. In snap fasteners employing socket and stud parts, a socket part having a tubular stud receiving portion defined by circumferentially arranged gripper fingers of essentially cylindrical curvature, the free ends of said gripper fingers having inwardly projecting gripper ends, said gripper ends having curved surfaces of a greater radius than the radius of curvature of said fingers, forming at the end of said stud receiving portion a restricted passage having stud engaging contact points substantially centrally of each of said gripper ends, and means supporting a spring ring on said fingers.

8. In snap fasteners employing socket and stud parts, a socket part having a tubular stud receiving portion defined by circumferentially arranged gripper fingers of essentially cylindrical curvature, the free ends of said gripper fingers having inwardly projecting gripper ends, said gripper ends having curved surfaces of a greater radius than the radius of curvature of said fingers, forming at the end of said stud receiving portion a restricted passage having stud engaging contact points substantially centrally of each of said gripper ends, the curvature of the surfaces of said gripper ends being eccentric to the curvature of said fingers, a spring ring encircling said fingers, and means on the fingers retaining the spring ring against displacement from said fingers.

9. In snap fasteners employing socket and stud parts, a socket part comprising a socket member of tubular form, the bore of said member being defined by circumferentially arranged gripper fingers, said fingers having a predetermined curvature in defining the cross-sectional contour of the bore of said socket member, free end portions of said fingers having stud engaging portions projecting into the bore defined by said fingers, said stud engaging portions forming a restricted passage in the bore of said fingers for engagement with the stud part, and said stud engaging portions presenting on each finger, centrally with respect to side edges thereof, restricted bearing surfaces for engagement with the stud part.

10. A socket part for coupling and uncoupling with a stud part of snap fastener devices, said socket part having a tubular bore, defined by circumferentially arranged independently flexing gripper fingers, each gripper finger being curved intermediate side edges thereof in defining a bore of predetermined cross-section by all of said fingers, and gripper means at the free end portions of said fingers presenting intermediate side portions of the fingers bearing surfaces engaged by the stud part in coupling and uncoupling the same with said socket member and in maintaining side portions of said fingers in spaced relation to said stud part.

11. A socket part for coupling and uncoupling with a stud part of snap fastener devices, said socket part having a tubular bore, defined by circumferentially arranged independently flexing gripper fingers, each gripper finger being curved intermediate side edges thereof in defining a bore of predetermined cross-section by all of said fingers, gripper means at the free end portions of said fingers presenting intermediate side portions of the fingers bearing surfaces engaged by the stud part in coupling and uncoupling the same with said socket member and in maintaining side portions of said fingers in spaced relation to said stud part, and said bearing surfaces being rounded to minimize frictional engagement with the stud part.

12. A socket part for coupling and uncoupling with a stud part of snap fastener devices, said socket part having a tubular bore, defined by circumferentially arranged independently flexing gripper fingers, each gripper finger being curved intermediate side edges thereof in defining a bore of predetermined cross-section by all of said fingers, gripper means at the free end portions of said fingers presenting intermediate side portions of the fingers bearing surfaces engaged by the stud part in coupling and uncoupling the same with said socket member and in maintaining side portions of said fingers in spaced relation to said stud part, said bearing surfaces being rounded to minimize frictional engagement with the stud part, and said bearing surfaces having a curvature, the radius of which is greater than the radius of the curvature of said gripper fingers.

13. In socket parts for coupling and uncoupling with a stud part of snap fastener devices, said socket part comprising a socket member having a tubular bore, the tubular bore being defined by circumferentially arranged independently flexing gripper fingers, each gripper finger being curved intermediate side edges thereof in defining a bore of predetermined cross-section by all of said fingers, gripper means at the free end portions of said fingers presenting intermediate side portions of the fingers bearing surfaces engaged by the stud part in coupling and uncoupling the same wtih said socket member and in maintaining side portions of said fingers in spaced-relation to said stud part, and said gripper means comprising beads disposed on inner surfaces only of said fingers.

OTTO J. HUELSTER.

REFERENCES CITED

The following references are of record in the file of this patent:

UNITED STATES PATENTS

| Number | Name | Date |
|---|---|---|
| 1,776,513 | Knutson | Sept. 23, 1930 |